United States Patent [19]
Cerrato

[11] Patent Number: 5,727,323
[45] Date of Patent: *Mar. 17, 1998

[54] PENCIL SHARPENER ACCESSORY

[76] Inventor: Jamie M. Cerrato, 67 Reynolds Ave., Parsippany, N.J. 07054

[*] Notice: The term of this patent shall not extend beyond the expiration date of Pat. No. 5,513,436.

[21] Appl. No.: 630,605

[22] Filed: Apr. 10, 1996

Related U.S. Application Data

[63] Continuation-in-part of Ser. No. 398,173, Mar. 2, 1995, Pat. No. 5,513,436.

[51] Int. Cl.$^6$ ...................................................... B26B 11/00
[52] U.S. Cl. ........................... 30/459; 7/163; 30/438
[58] Field of Search ........................ 30/451, 454, 455, 30/458, 459, 296.1; 7/160, 163; 33/260, 268, 270, 138; D19/73

[56] References Cited

U.S. PATENT DOCUMENTS

| D. 221,907 | 9/1971 | Kajiwara | D19/73 |
| 3,991,798 | 11/1976 | Grosjean | 30/455 X |
| 4,744,150 | 5/1988 | Horvath | 33/138 |

*Primary Examiner*—Douglas D. Watts

[57] ABSTRACT

A pencil sharpener, including a body member having a bottom surface with a first predetermined configuration, a top surface with a second predetermined configuration, and a recess in the top surface extending from a periphery of the body member across a portion of the body member, a blade mounted to the top surface of the body member adjacent an upper edge of the recess so as to enable sharpening of a pencil, and adhesive provide at the bottom surface of the body member for selectively fastening the body member to another article.

14 Claims, 1 Drawing Sheet

PENCIL SHARPENER ACCESSORY

This application is a continuation-in-part of U.S. patent application Ser. No. 08/398,173, filed Mar. 2, 1995, now U.S. Pat. No. 5,513,436.

BACKGROUND OF THE INVENTION

1. Field of the Invention

The present invention relates to a pencil sharpener, and more particularly to a pencil sharpener that is configured as an accessory that can be easily attached to other articles, such as a tape measure, a tool box, a note book, the dash board of a vehicle, etc. . .

2. Description of the Prior Art

It is well known in the construction, carpentry and woodworking professions that when measuring pieces of material, a pencil is used to mark the desired measurement as identified by a tape measure. Pencils are also used for numerous other purposes, such as jotting down notes and making sketches. Due to the frequent use of the pencil and the oft-times rough surface of the material being drawn, marked or written upon, the pencil is rapidly worn down. It is thus necessary to sharpen the pencil frequently in order to maintain a good point for clear and accurate marks.

In the construction trades it has been the practice in the past to sharpen the pencil by using either a pocket knife or a utility knife. In addition to being dangerous and time consuming, sharpening with a knife does not provide a uniform point to the pencil.

Dull pencils are also a common problem for students who in the middle of a class, test or lecture are not able to sharpen their pencils because of not having a pencil sharpener conveniently available.

Various types of pencil sharpeners are presently known and commercially available. The following U.S. patents teach some of the known types of sharpeners: 503,794; 4,744,150; 5,040,256; Des. 324,184; Des. 339,536; and Des. 341,545. German reference 10 51 165 also discloses a type of pencil sharpener.

SUMMARY OF THE INVENTION

Accordingly, it is an object of the present invention to provide a pencil sharpener that can be used as an accessory with numerous types of articles.

Another object of the invention is to provide a pencil sharpener that is specifically intended for use with a tape measure.

Still a further object is to provide a sharpener that can be easily and securely mounted to other objects.

Pursuant to these objects, and others which will become apparent hereafter, one aspect of the present invention resides in a pencil sharpener accessory comprising a body member having a bottom surface with a first predetermined configuration, a top surface with a second predetermined configuration, and a recess in the top surface which that extends substantially across the body member from the periphery of the body member. The recess having a tapered end that conforms to the shape of the sharpened end of a pencil. A blade is mounted to the upper surface of the body member adjacent to an upper edge of the recess so that a pencil can be sharpened by being inserted into the recess and rotated. Furthermore, means are associated with the bottom surface of the body member for adhering the sharpener to another article, such as a tape measure, a tool box, a note book, a car dashboard, etc . . .

The above-mentioned and other features and objects of this invention will become more apparent by reference to the following description taken in conjunction with the accompanying drawing.

DETAILED DESCRIPTION OF THE PREFERRED EMBODIMENTS

Figure 1:
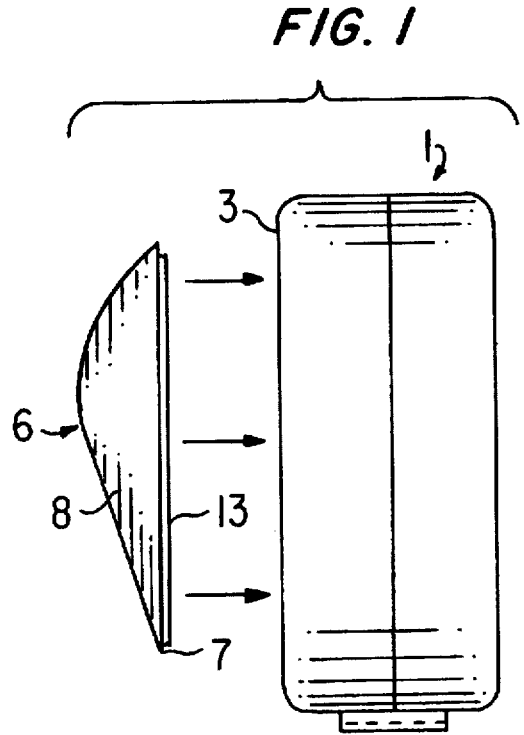
FIG. 1 is an exploded side view of the inventive pencil sharpener and a tape measure on which it is to be attached.
Figure 2:
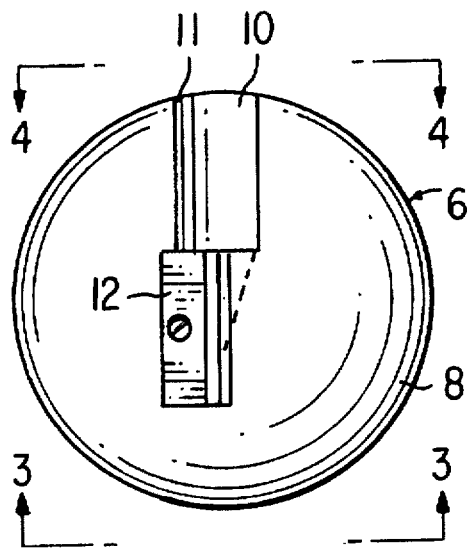
FIG. 2 is a top view of the pencil sharpener of FIG. 1.

Referring to FIGS. 1–5, the pencil sharpener of the present invention is illustrated as an accessory that can be attached to another article. The invention will be described in conjunction with a tape measure, but it is readily usable on other articles, such as note books, tool boxes, and vehicle dash boards.

The tape measure 1, or any other article on which the pencil sharpener is to be fastened, has a flat surface 3.

The pencil sharpener includes a body member 6 having a bottom surface 7 with a first predetermined configuration, illustrated in the drawings to be circular, and a top surface 8 with a second predetermined configuration. The body member 6 has a recess or channel 10 in the top surface 8 so as to extend from the periphery 11 substantially across the body member 6 but not completely to the diametrically opposite peripheral side. The recess 10 is configured to be tapered at its end in the body member 6 so as to be able to receive a sharpened pencil.

A blade 12 is mounted to the upper surface 8 of the body member 6 along the edge of the tapered end of the recess 10 to enable sharpening of a pencil. Means 13 are provided on the bottom surface 7 of the body member 6 for mounting the body member 6 to the flat surface 3 of the article (tape measure 1). Preferably, the mounting means 13 is a thin foam or other resilient material mounted to the bottom surface 7 of the body member 6 and having an outwardly directed adhesive surface that is covered by a release sheet that can be removed to expose the adhesive when it is desired to mount the pencil sharpener to the other article. The mounting means 13 can be a double-sided foam tape or also a single-sided foam tape. These more permanent mounting means are well suited for mounting the pencil sharpener to articles that are subject to hard or rough use where the sharpener and mounting would have to withstand blows and shocks and still remain attached to the article, such as tape measures. It is also possible to utilize a releasable fastener for the mounting means 13 when the pencil sharpener is intended for application to articles that are not as subject to rough use. An acceptable releasable fastener is of the hook and loop type commonly available under the Trademark VELCRO. Such a releasable fastener is desirable for use with articles such as note books, tool boxes and automobile dashboards.

Figure 3:
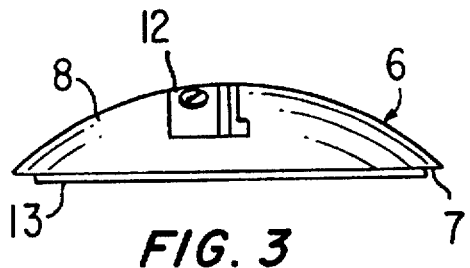
FIG. 3 is a back view of the pencil sharpener of FIG. 1.
Figure 4:
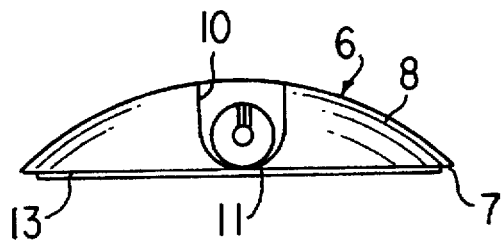
FIG. 4 is a front view of the pencil sharpener of FIG. 1.
Figure 5:
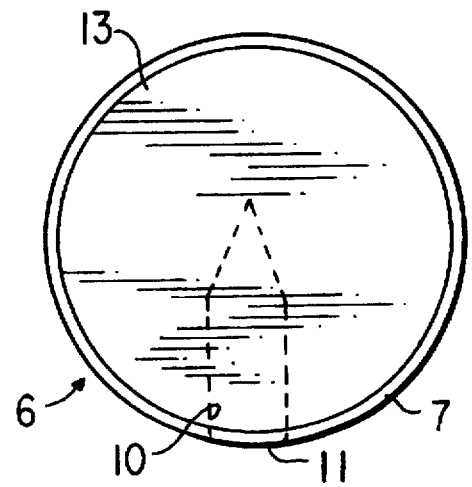
FIG. 5 is a bottom view of the pencil sharpener of FIG. 1.

The second predetermined configuration of the top surface 8 is such that it rises a predetermined amount adjacent the recess 10 from the periphery 11 and then tapers or slopes down to the periphery of the body member 6 remote from the recess 10, substantially as shown in FIGS. 1, 3 and 4. The second predetermined configuration including the taper or slope is selected to provide a comfortable feel and zero interference with the hand of the user of the article on which the pencil sharpener is attached, or with the article itself.

The top surface 8 of the body member 6 can also have any one of a number of configurations, based upon the intended final use of the pencil sharpener. For example, if the sharpener is intended to be used in a notebook it is shaped so as not to interfere with the operation and use of the notebook and so as to be easily and comfortably used by an individual sharpening a pencil.

The configuration of the top surface 8 is such that a relatively large area thereof is smooth and open for use as advertising space.

While the invention has been described above in connection with a specific embodiment, it is to be clearly understood that this description is made only by way of example and not as a limitation to the scope of the invention as set forth in the accompanying claims.

I claim:

1. A pencil sharpener, comprising:
a body member having a bottom surface with a first predetermined configuration, a top surface with a second predetermined configuration, the top surface and the bottom surface meeting at a periphery of the body member, and a recess in the top surface extending from the periphery of the body member across a portion of the body member and having a tapered end with an upper edge; a blade mounted adjacent the upper edge of the tapered end of the recess so as to enable sharpening of a pencil; and means connected to the bottom surface of the body member for selectively fastening the body member to another article.

2. A pencil sharpener as defined in claim 1, wherein the bottom surface is flat.

3. A pencil sharpener as defined in claim 1, wherein the fastening means is adhesive fastening means.

4. A pencil sharpener as defined in claim 1, wherein the first predetermined configuration is circular.

5. A pencil sharpener as defined in claim 3, wherein the adhesive fastening means includes a thin resilient sheet-like member mounted to the bottom surface of the body member, the resilient sheet-like member having an outwardly directed adhesive surface and a release sheet removably attached to the adhesive surface.

6. A pencil sharpener as defined in claim 5, wherein the resilient sheet-like member is a foam member.

7. A pencil sharpener as defined in claim 3, wherein the adhesive fastening means includes an adhesive applied to the bottom surface of the body member, and a release sheet provided on top of the adhesive so as to be selectively removable therefrom.

8. A pencil sharpener as defined in claim 1, wherein the second predetermined configuration rises a predetermined amount adjacent the recess from the periphery and slopes down to the periphery remote from the recess.

9. A pencil sharpener as defined in claim 4, wherein the second predetermined configuration rises a predetermined amount adjacent the recess from the periphery and slopes down to the periphery remote from the recess.

10. A pencil sharpener as defined in claim 1, wherein the fastening means includes one pan of a hook and loop type fastener.

11. A pencil sharpener as defined in claim 1, wherein the recess is a channel.

12. A pencil sharpener, comprising:
a body member having a bottom surface with a first predetermined configuration, a top surface with a second predetermined configuration, and a recess in the top surface extending from a periphery of the body member across a portion of the body member to a tapered end having an upper edge; a blade mounted to the top surface of the body member adjacent the upper edge of the tapered end of the recess so as to enable sharpening of a pencil; and adhesive means connected to the bottom surface of the body member for selectively fastening the body member to another article, the fastening means including a thin resilient sheet-like member mounted to the bottom surface of the body member, the resilient sheet-like member having an outwardly directed adhesive surface and a release sheet removably attached to the adhesive surface.

13. A pencil sharpener as defined in claim 12, wherein the resilient sheet-like member is a foam member.

14. A pencil sharpener, comprising:
a body member having a bottom surface with a first predetermined configuration, a top surface with a second predetermined configuration, and a recess in the top surface extending from a periphery of the body member across a portion of the body member to a tapered end having an upper edge; a blade mounted to the top surface of the body member adjacent the upper edge of the tapered end of the recess so as to enable sharpening of a pencil; and adhesive means connected to the bottom surface of the body member for selectively fastening the body member to another article, the adhesive fastening means including an adhesive applied to the bottom surface of the body member, and a release sheet provided on top of the adhesive so as to be selectively removable therefrom.

* * * * *